Fig. I.

Nov. 2, 1954  R. F. BARRELL  2,693,561
IGNITRON CONTROLLED THREE-PHASE INDUCTION MOTOR
Filed May 9, 1952  6 Sheets-Sheet 2

WITNESSES:
John E. Hinsley
Leon J. Faza

INVENTOR
Robert F. Barrell.
BY
Paul E. Friedemann
ATTORNEY

Nov. 2, 1954  R. F. BARRELL  2,693,561
IGNITRON CONTROLLED THREE-PHASE INDUCTION MOTOR
Filed May 9, 1952  6 Sheets-Sheet 3

WITNESSES:
John E. Hensley
Leon J. Taja

INVENTOR
Robert F. Barrell.
BY
Paul E. Friedemann
ATTORNEY

Nov. 2, 1954

R. F. BARRELL 2,693,561

IGNITRON CONTROLLED THREE-PHASE INDUCTION MOTOR

Filed May 9, 1952

WITNESSES:
John E. Heasley
Leon J. Taza

INVENTOR
Robert F. Barrell.
BY
Paul E. Friedmann
ATTORNEY

Nov. 2, 1954     R. F. BARRELL     2,693,561
IGNITRON CONTROLLED THREE-PHASE INDUCTION MOTOR
Filed May 9, 1952                             6 Sheets-Sheet 6

WITNESSES:

INVENTOR
Robert F. Barrell.
BY
ATTORNEY 2,693,561
Patented Nov. 2, 1954

UNITED STATES PATENT OFFICE 2,693,561

IGNITRON CONTROLLED THREE-PHASE INDUCTION MOTOR

Robert F. Barrell, Lancaster, N. Y., assignor to Westinghouse Electric Corporation, East Pittsburgh, Pa., a corporation of Pennsylvania Application May 9, 1952, Serial No. 286,891

14 Claims. (Cl. 318—227)

My invention relates to the control and application of electric discharge apparatus and has particular relation to electronic motor control apparatus.

My invention is an improvement on the invention disclosed and claimed in the pending patent application of William E. Large and Robert F. Barrell, filed on October 21, 1949, Serial No. 122,694, and entitled Electric Discharge Apparatus. Some of the subject matter of the earlier application is restated in this application so as to herein present a very complete disclosure, thus eliminating the necessity of having to refer to the earlier application.

In its specific aspects, my invention was made to provide a motor drive suitable for operating relatively large automobile body presses. In accordance with the teaching of the prior art of which I am aware, an automobile body press is driven either by a low torque motor having a flywheel of high inertia on its shaft or by a high torque motor not requiring a flywheel.

When a low torque motor is used, power from the motor is transmitted to the press through a clutch. As the press engages the material to be formed and is disengaged from it, the clutch is repeatedly engaged and disengaged. While so operated, the clutch is repeatedly subjected to impacts of large magnitude and is frequently damaged. In any event, the clutch life is relatively short. To overcome the shortcomings of the low-torque motor, it has been proposed that the low-torque-motor-clutch combination be replaced by a relatively high-torque motor of the polyphase multiple-winding type directly geared to the press mechanism. Such a high torque motor has a very high current demand. Since the motor must be started and stopped each time a piece of work is formed, the control of the motor presents a challenging problem.

It is, accordingly, an object of my invention to provide a motor control system for driving directly the mechanism of a heavy duty press such as is utilized in the forming of automobile bodies.

A more general object of my invention is to provide a motor assembly including a high-torque motor and control apparatus for repeated starting and stopping of the motor.

Another general object of my invention is to provide an assembly including a rugged motor, having two or more primary windings capable of withstanding large mechanical impacts, and which shall have a high degree of flexibility in its operation.

An ancillary broad object of my invention is to provide a control system for a high-torque motor having a plurality of stator windings which shall operate without substantial deterioration of control components.

My invention arises from the realization that the gist of the problem of providing a motor assembly to drive a press resides in the control mechanism of the motor. Since the motor must start and stop for each operation of the press, a mechanism must be provided for repeatedly interrupting the current flow through the primary of the motor. Since the motor is of the high-torque type and draws very large currents, the mechanism must be capable of conducting such currents without substantial deterioration. Mechanical contacts would not meet this requirement satisfactorily. Electronic devices, however, do interrupt current flow without deterioration to the current conducting elements.

In accordance with my invention, I provide a motor assembly including a polyphase motor, each phase winding of which is supplied through electric discharge valves. The valves are preferably of the mercury pool type, such as ignitrons, and two valves are interposed in antiparallel between each terminal of a polyphase supply and a terminal of a motor winding.

The power factor of a motor of the type under consideration changes as the motor comes up to speed. The valves are fired in such phase with relation to the pulsations of the supply so as to minimize excessive currents by reason of transients taking this variation into consideration.

Certain systems in accordance with my invention include a motor, the power factor of which decreases as the motor speed rises from zero to the desired magnitude. In one system which we have encountered, the power factor is 40% when the motor is first started and 17% when the motor reaches the desired speed. In such systems, the control circuits for the valves are set to fire the valves so that whatever transient may arise when the motor is started is a minimum. As the motor comes up to the desired speed, the power factor gradually decreases. Because of the decrease in power factor, the valves which have been conducting and are about to be extinguished continue to conduct until other valves take over. A hiatus in the conductivity of the valves is thus avoided. Under certain circumstances, particularly when the motor operates at full voltage, such hiatus is undesirable. Motor assemblies, in accordance with my invention, may also include motors, the power factor of which increases as they come up to speed. The control systems for such motors may be provided with components for advancing the instant of firing in the half-periods of the supply as the power factor of the motor increases.

The motor windings impress back electromotive forces in their associated valve circuits. These electromotive forces counteract the supply potential. At times the net potential available in the circuit of any valve may be so small that the valve may fail to fire when its firing potential is impressed. If the firing potential were derived from the supply, it, too, may be affected by the back electromotive forces. These difficulties are overcome in accordance with my invention by providing a firing circuit for each valve which is independent of the motor voltage by providing an auxiliary anode circuit for each valve to sustain the arc of a valve through the complete range of the motor power factor angle. The independent firing circuit supplies sufficient potential to fire the valve regardless of the back electromotive force and the auxiliary circuit produces an arc which thus provides the ionization for the main arc when the main anode potential reaches the proper magnitude.

A leading manufacturer of direct drive presses for the heavy-duty presses hereinabove mentioned requires induction motors having locked rotor currents ranging from 800 amperes to 2,850 amperes. The largest ignitron tubes now available for this type of use will handle motors having locked rotor currents of approximately 1500 amperes.

From the foregoing, it is apparent that a single pair of tubes is only good for the lower motor ratings in this kind of application due to the limitations imposed by the peak current rating of the tubes.

The range of tube application for the use in mind could be extended considerably if a cheap method of paralleling ignitron tubes could be devised for a press drive system or any other system requiring current loads above the top current rating of each ignitron tube. Since a minimum number of twelve electronic tubes would be required for a proper operation of a three-phase installation, a system of control utilizing the known methods of paralleling ignitron tubes, that is, with anode reactors, would be an extremely expensive system due to the high cost of the six reactors that would be needed.

When ignitrons are to be operated in parallel, it is essential that a balancing reactor be used. There are several functions such a reactor provides.

The firing voltage of an ignitron tube is somewhat higher than the normal conducting voltage of an ignitron. If two ignitrons are connected in parallel and no balancing reactor is used, it is well known that as soon as one tube, or ignitron, becomes conducting, the voltage drop across the tubes decreases and, in consequence, the second tube will not fire at all and the aim of parallel operation is not obtained.

When a balancing reactor is connected in the circuit of ignitrons connected in parallel, then when one tube fires first, the current surge increases the voltage, additive to the supply voltage, across the second tube and the second tube immediately becomes conducting. From the foregoing, it is apparent that the instant one tube fires, the firing of the second tube follows immediately.

During normal parallel operation of ignitrons, namely, with the use of balancing reactors, if one of the discharge valves, or ignitrons, tends to take more than its share of the load, the current rise in the valve assuming the greater load induces a higher voltage across the second valve to thus balance the load.

The function discussed in the preceding paragraph is of considerable importance during the time the valves are to drop their load. It is very damaging to the ignitrons to have one ignitron tube drop its load faster than the other. The balancing coil, or balancing reactor, maintains the current decay in both tubes at the same rate to zero current at the same time.

Further, if the valves or ignitrons become non-conducting at the same instant, which instant is adjusted to take place before the polarity on the tubes changes, ionization does not persist beyond the time period of the voltage polarity change on the main electrode and in consequence backfiring of the tubes is prevented.

It is the practice in the manufacture of induction motor starters to parallel several individual coils on the stator or primary windings. This paralleling is done on the end turns of the stator windings.

I propose to attach leads to each of these coils and to bring each of these leads outside of the motor frame. In each of these leads, I connect a pair of ignitrons in anti-parallel and then properly connect these ignitrons to the three-phase supply. Thus, the stator windings of the motor act as the balancing reactor for the particular pair of ignitrons connected in parallel.

The simplest arrangement of my invention is provided for motors having two stator windings that are to be connected in parallel. In this arrangement, the two halves of the parallel stator winding will perform the function of an anode reactor.

With my arrangement, ignitrons may be used with induction motors having current ratings of twice, or three times, the value of the current rating of the largest ignitrons now known, depending on whether two or three stator windings are connected in parallel through parallelly connected ignitrons.

It is thus a broad object of my invention to provide a cheap and reliable paralleling control for ignitron tubes when used to supply current to a load, as an induction motor.

It is also a broad object of my invention to utilize two parallelly connected inductive loads, for a pair of parallelly connected ignitrons supplying the loads, as the starting, or anode, reactors for the ignitrons.

Other objects and advantages will become more readily apparent from a study of the following specification, and the accompanying drawings, in which.

Figure 3:
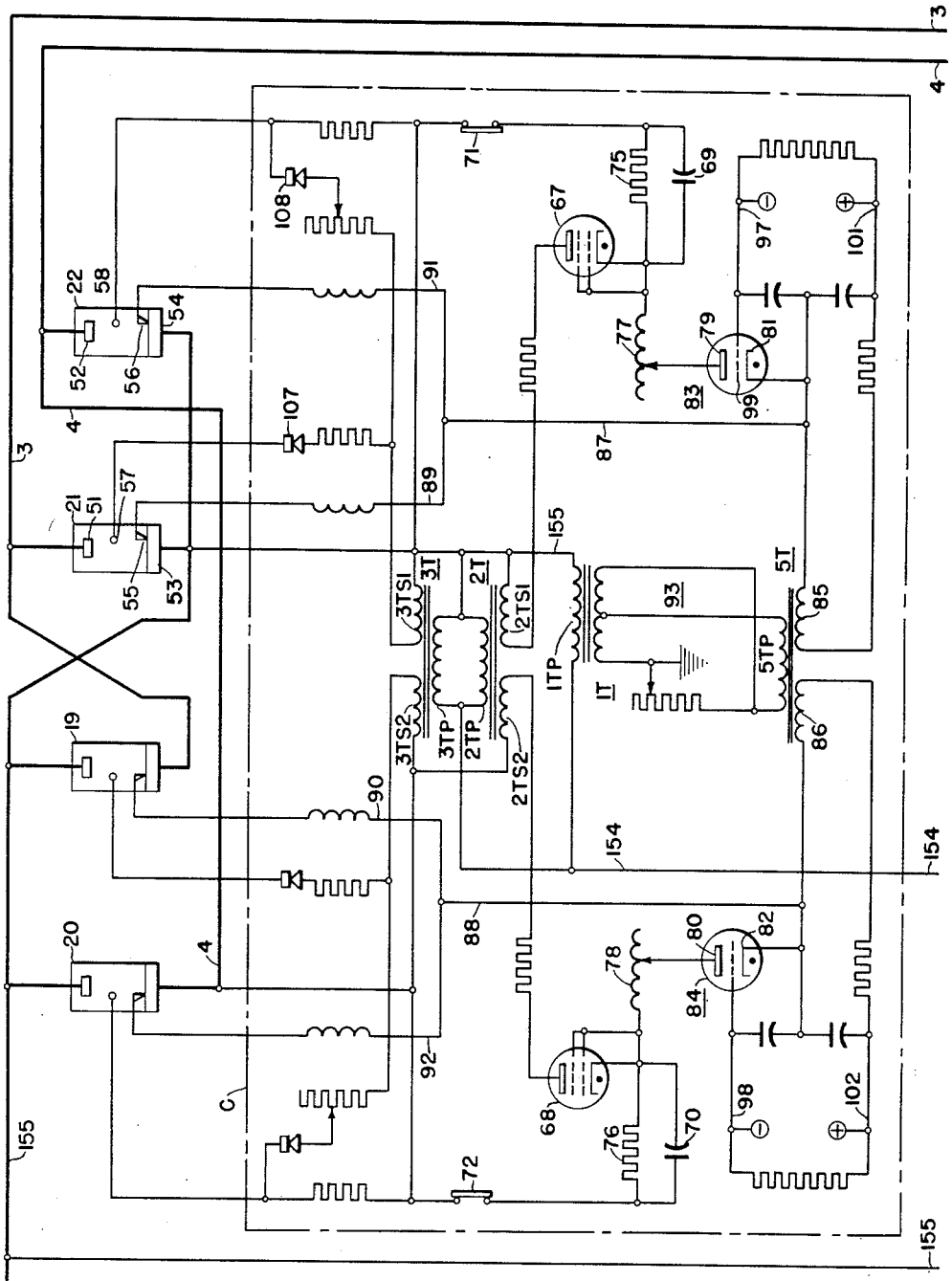
Figure 3A:
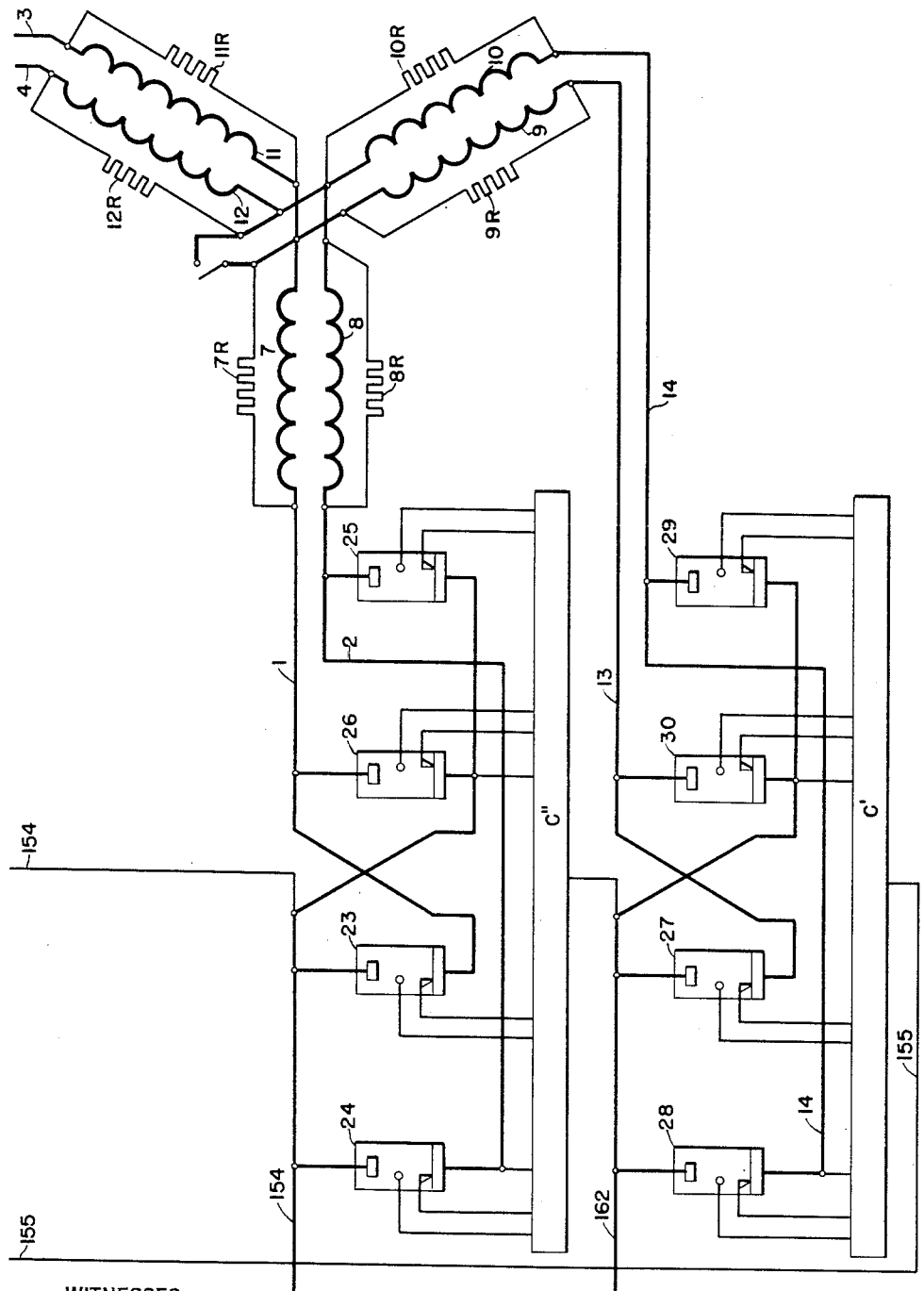

Figs. 3 and 3a, taken together, show a circuit diagram of an embodiment of my invention with one phase of the motor and the controls, therefore, shown in considerable detail.

Figure 1:
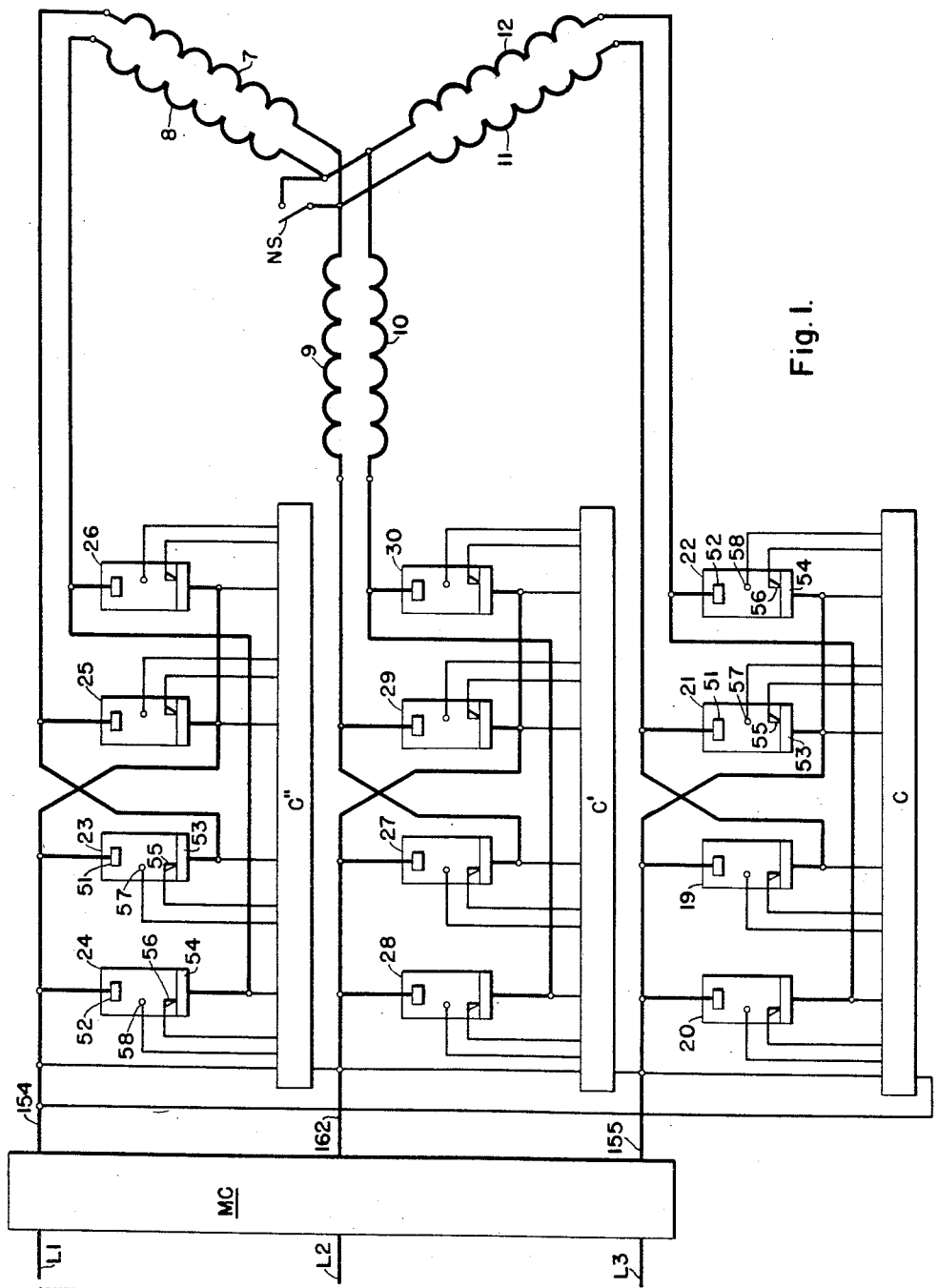
Figure 1 is a schematic showing of my invention as applied to an electric motor having its primary windings connected in Y.
Figure 4:
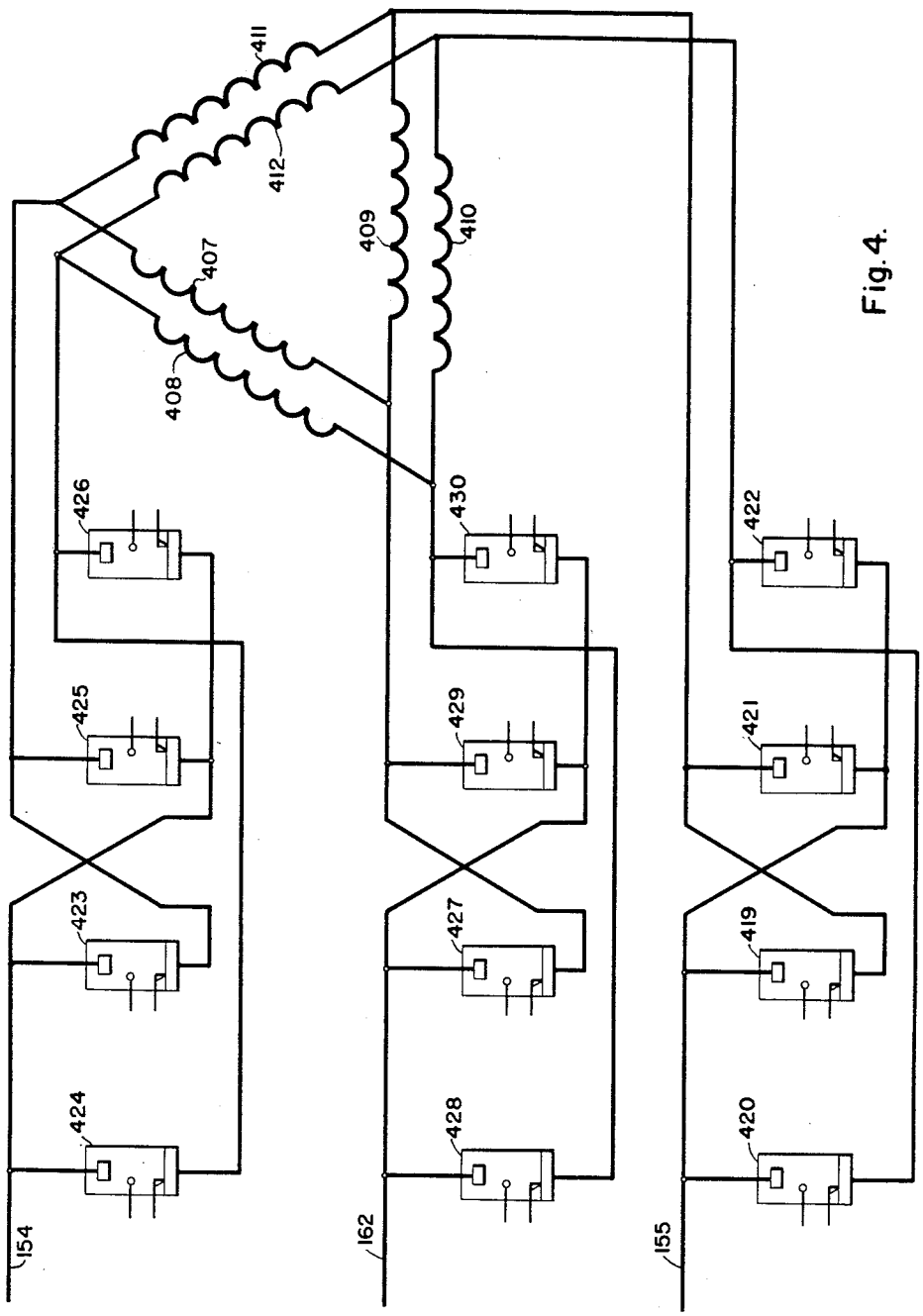
Figure 5:
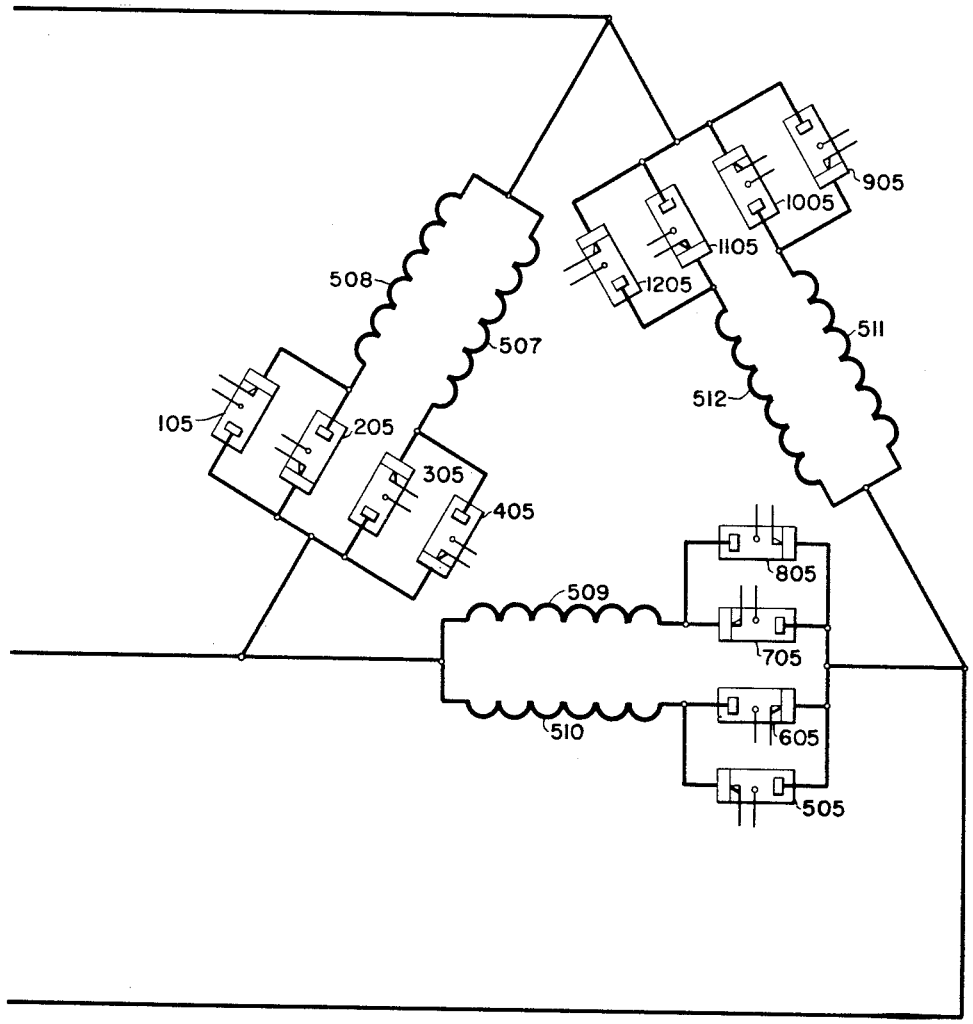

Fig. 4 is a schematic showing, similar to the showing in Fig. 1, of my invention as applied to delta connected motor primary windings; and Fig. 5 is a schematic showing of a modified arrangement of my invention of an induction motor having two primary windings connected in delta.

From the showing in Fig. 1, it is apparent that the three-phase motor M includes the stator windings 7 and 8 of the first phase, the windings 9 and 10 of the second phase, and the windings 11 and 12 of the third phase, with corresponding windings of each phase, as for example windings 7 and 9 connected in parallel with windings 8 and 10, respectively.

The motor M is supplied from the buses L1, L2, and L3 through the master controller MC. Assuming the master controller is operated to energize leads 154, 162, and 155, then the lead 155 is connected to the free terminal of the motor winding 11 through a pair of ignitrons 19 and 21 in anti-parallel and is connected to the free terminal of the motor winding 12 through a pair of ignitrons 20 and 22 in anti-parallel.

The lead 154 is connected to the free terminal of the motor winding 7 through a pair of ignitrons 23 and 25 in anti-parallel and is connected to the free terminal of the motor winding 8 through a pair of ignitrons 24 and 26 in anti-parallel. Similarly, the lead 162 is connected to the free terminal of the motor winding 9 through the ignitrons 27 and 29 in anti-parallel and is connected to the free terminal of the motor winding 10 through the ignitrons 28 and 30 in anti-parallel.

From the circuits just discussed it will be apparent that the stator windings of corresponding phases are connected in parallel. Further the arrangement is such as if two induction motors were in the same frame. However, if the neutral points are connected by means of a suitable jumper, or the leads and switch NS shown, then the independence of the stator windings is eliminated. Usually the neutral points need not be connected.

The ignitrons in circuit with the motor windings are all alike, those associated with one set of stator windings having the anodes 51, cathodes 53, igniters 55, and the auxiliary anodes 57, whereas those associated with the other stator windings having the anodes 52, cathodes 54, igniters 56, and the auxiliary anodes 58. The firing current is supplied to each of the igniters independently of the anode voltage. The supply of the firing current is timed in accordance with the manner in which the motor windings are connected. The firing and timing control system C for two ignitrons operating in parallel is shown in Figs. 3 and 3a. Similar firing and timing control circuits as C' and C'' are provided for each of the other pair of ignitrons operating in parallel.

The firing circuit for each pair of parallelly connected ignitrons respectively connected in anti-parallel with another pair of parallelly connected ignitrons includes a transformer 2T having the primary winding 2TP which is supplied from the leads 155 and 154 from which the associated ignitrons 23 and 24, and 21 and 22 receive their anode potential.

Across one secondary 2TS1 of this transformer a rectifier 67 and a capacitor 69 are connected in series through the closed contact 71 of a starting relay, not shown but included in the control of the master controller MS. The capacitor is accordingly charged from this secondary 2TS1 when the contact 71 is closed. The secondary is so connected that the anode potential supplied to the rectifier is in opposite phase to the anode potential supplied to the associated ignitrons 21 and 22. With the contact 71 closed, the capacitor 69 is accordingly charged while the anode potential of the ignitrons 21 and 22 is negative. When the apparatus is not in operation any residual charge on the capacitor 69 is dissipated in the resistor 75.

The capacitor 69 is connected in a circuit including an adjustable inductance 77, the anode 79 and cathode 81 of a thyratron 83, the igniters 55 and 56 of the associated ignitrons 21 and 22 and the associated cathodes 53 and 54. The thyratron 83 is ordinarily maintained non-conductive by a bias supplied from the secondary 85 of the bias transformer 5T. The bias is counteracted by potential derived from the terminals 97 and 101 marked negative (—) and positive (+) respectively.

The primary 5TP of the transformer 5T is supplied through a phase shifter 93 from the leads 155 and 154 to which the associated ignitrons 21 and 22 are connected. The negative output terminal 97, of the circuit including the direct current supply and the output of the transformer secondary 85, is connected to the control electrode 99 of the thyratron and the positive terminal to the cathode 81. This circuit when energized supplies inverted half-waves in the control circuit of the thyratron 83. The maximum points of these half-waves occur at instants predetermined by the phase shifter 93. At these instants the thyratron 83 is fired conducting firing current through the conductors 87, 89 and 91 to the igniters 55 and 56.

The anodes 51 and 52 and the cathodes 53 and 54 of the ignitrons 21 and 22 are, respectively, connected in series with the motor windings 7 and 11, and 8 and 12. When the motor is in operation, an inverse potential is impressed in the anode-cathode circuits of the ignitrons 21 and 22. This inverse potential counteracts the supply potential and tends to reduce the anode-cathode potential of the ignitrons 21 and 22. In addition, the power factor of the motor changes as it comes up to speed. Because of the changing motor power factor and because of the inverse potential supplied by the motor, the anode potential of the ignitrons 21 and 22 may be insufficient for firing at the instant when the firing capacitor 69 is discharged through the igniters 55 and 56. To assure that the ignitrons will fire when they reach proper anode potential, auxiliary firing circuits are provided. These circuits include the secondary 3TS1 of another transformer 3T supplied from the leads 154 and 155 from which the ignitrons are supplied, and rectifiers 107 and 108 and the auxiliary anodes 57 and 58 of the ignitrons 21 and 22. Since these auxiliary circuits are independent of the motor, the potential of the auxiliary anodes is independent of the motor power factor and motor counter voltage. Auxiliary arcs are accordingly fired at the instant when the firing capacitor 69 is discharged through the igniters 55 and 56. These auxiliary arcs maintain a cathode spot in each of the ignitrons 21 and 22, and when the main anode potentials reach the proper magnitude, main arcs are initiated at the spots between the main anodes 51 and 52 and the cathodes 53 and 54, respectively.

Figure 2:
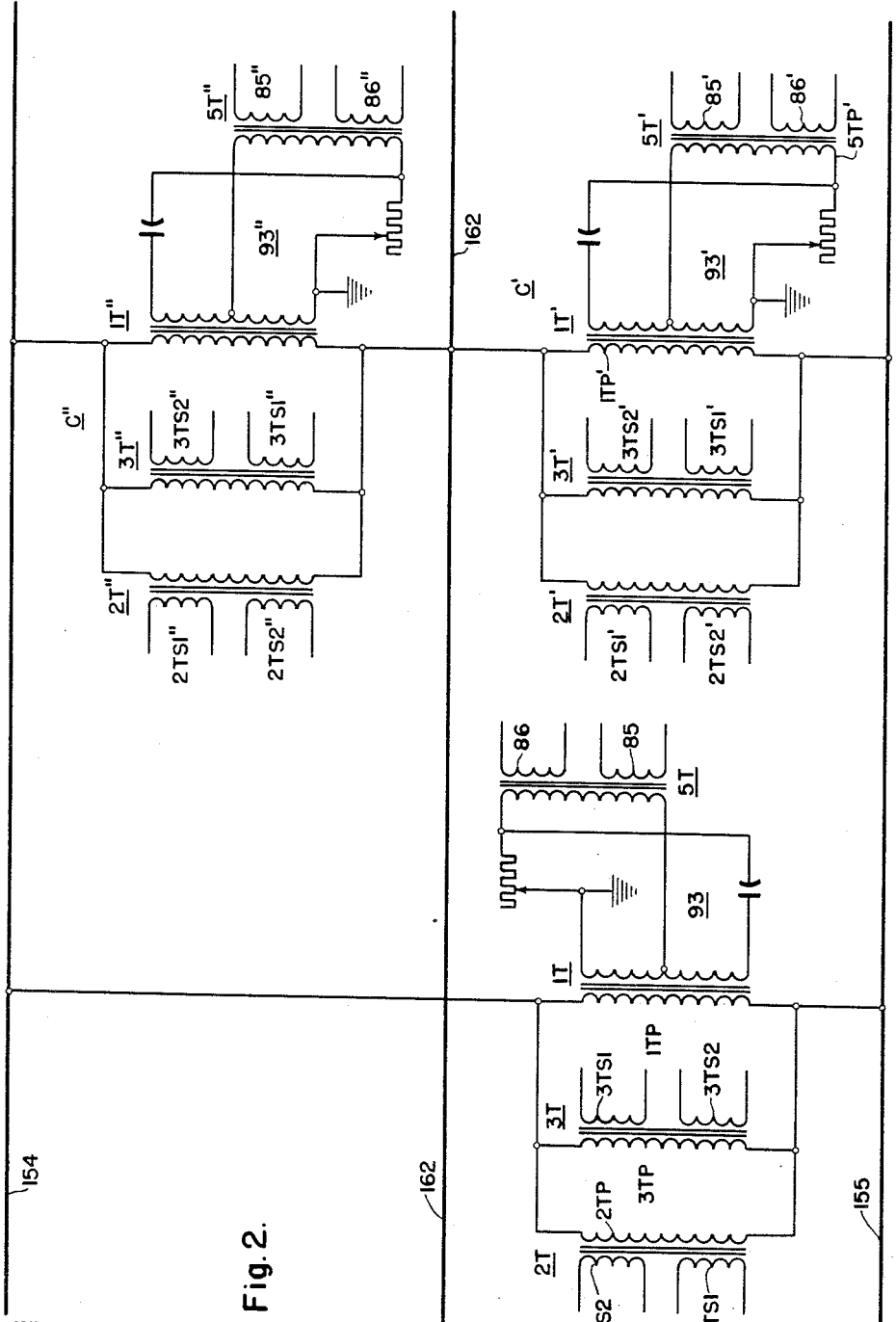
Fig. 2 is a circuit diagram showing how the system of control for the ignitron tubes of all three phases is connected to the supply leads.

In Fig. 2, I show some of the details of the supply circuits for the control and wherein the control portion shown connected between the leads 155 and 154 is the portion shown more in detail in Figs. 3 and 3a, whereas the portion in the upper right hand corner of Fig. 2 may be considered as part of control C" the control connected between leads 154 and 162, and the portion in the lower right hand corner a portion of control C', the control connected between leads 162 and 155. The reference characters 2T", 3T", 5T", etc. and the reference characters 2T', 3T', 5T', etc. correspond respectively to the controls C" and C'.

To better understand the operation of my system of control let the assumption be that leads 154, 155, and 162 are energized, that the necessary control relays have operated, and that lead 154 at the moment is of such positive value and the control so adjusted that ignitron 23 is fired. The firing characteristics of valves or ignitrons 23 and 21 are made as near identical as possible, but regardless of this precaution of design and adjustment it follows that when valve 23 fires valve 21 must necessarily fire because it is in series with valve 23.

The conducting circuit for the motor is thus from lead 154 through the valve 23, conductor 1, motor primary winding 7, motor primary winding 11, conductor 3, valve 21 to the lead 155.

Since the windings 7 and 8 are inductively coupled and windings 11 and 12 are inductively coupled, and since the series circuit of windings 7 and 11 is in parallel to the series circuit of windings 8 and 12, the motor windings function as an anode reactor, or as a balancing reactor as it is often called, to cause voltage surges, including at least one high voltage peak, to thus immediately fire the valves 24 and 22 connected in series.

Under these circumstances current flows from the lead 154 through the valves 23 and 24, the conductors 1 and 2, motor windings 7, 8, 11 and 12, conductors 3 and 4 and valves 21 and 22 to the lead 155. The current conducted rises and then decreases and eventually just before valves 23 and 24 cease conducting the valves 27 and 28 are fired.

The current now flows from lead 162 through the ignitrons 27 and 28, conductors 13 and 14, motor windings 9 and 10, and 11 and 12, conductors 3 and 4 and the valves 21 and 22 to the leads 155. The current rises and decreases and just before the valves 21 and 22 become non-conductive the valves 25 and 26 are fired.

The current now flows from lead 162 through the valves 27 and 28, conductors 13 and 14, motor windings 9 and 10, and 7 and 8, conductors 1 and 2, valves 25 and 26 to the lead 154. The current rises and decreases and just before valves 27 and 28 become non-conductive the valves 19 and 20 are fired.

The current now flows from lead 155 through the valves 19 and 20, conductors 3 and 4, motor windings 11 and 12, and 7 and 8, conductors 1 and 2, valves 25 and 26 to the lead 154.

The details for firing the tubes 19 and 20 are also shown in Figs. 3 and 3a. The elements shown by the reference characters 68, 70, 72, 76, 78, 80, 82, 84, 86, 88, 90, 92, 98, and 102 have the same structure and function as the elements designated by the reference characters 67, 69, 71, 75, 77, 79, 81, 83, 85, 87, 89, 91, 97, and 101, respectively.

Just before valves 25 and 26 became non-conductive the tubes 29 and 30 are fired. The current now flows from lead 155 through the valves 19 and 20, conductors 3 and 4, motor windings 11 and 12 and 9 and 10, conductors 13 and 14 and valves 29 and 30 to the lead 162. The current rises and falls and just before tubes 19 and 20 became non-conducting the tubes 23 and 24 are fired.

The current now flows from lead 154 through the ignitrons 23 and 24, conductors 1 and 2, motor windings 7 and 8, and 9 and 10, conductors 13 and 14, valves 29 and 30 to the lead 162. The current again rises and falls and just before tube valves 29 and 30 become non-conductive the tubes 21 and 22 are fired and the current flows as indicated at the start of the cycle. The cycle repeats to thus provide the rotating field and thus the motor torque for driving the load.

The surge resistors 7R, 8R, 9R, 10R, 11R, and 12R connected across the primary windings 7, 8, 9, 10, 11 and 12, respectively, are rather important with the apparatus I disclose. When the ignitrons cease conducting the current drop in the ignitrons is extremely rapid. The induced voltages in the stator windings might cause a break-down of the insulation in the absence of the surge resistors.

While I have, in Figs. 1, 3 and 3a, shown my system of control applied to a particular arrangement, a Y-arrangement, of the primary windings of an induction motor, my invention is equally useful with motors having their primary windings connected in delta.

For example, in Fig. 4, ignitrons 423 and 425, connected in anti-parallel, are connected between lead 154 and the upper terminal of the delta connected primary windings 407, 409, and 411, and ignitrons 424 and 426, connected in anti-parallel, are connected between lead 154 and the upper terminal of the delta connected primary windings 408, 410, and 412.

Ignitrons 427 and 429, and ignitrons 428 and 430 are similarly connected with resepct to each other, are similarly connected between lead 162 and the left-hand terminals of the delta connected primary windings 407, 409 and 411, and 408, 410 and 412, respectively.

Also the ignitrons 419 and 421, and 420 and 422 are similarly connected with respect to each other, are the right-hand terminals of the same delta connected primary windings.

The ignitrons may also be connected within the delta arrangement of the motor primary windings. This is shown rather schematically in Fig. 5. In this case the primary windings 507 and 508 act as starting and balancing reactors for the ignitrons 105, 205, 305, and 405, the primary windings 509 and 510 act as starting and balancing reactors for ignitrons 505, 605, 705, and 805, and the primary windings 511, 512, act as starting and balancing reactors for the ignitrons 905, 1005, 1105, and 1205. Such changes in the control for the showings in Figs. 4 and 5 over the showing in Figs. 3 and 3a as are needed are, in view of the teachings of Figs. 3 and 3a, well within the skill of those versed in the art to which my invention belongs.

While I have shown but few embodiments of my invention it is understood that my invention is capable of various adaptations and that still other changes and modifications may be made or substitutions resorted to which all come within the spirit of the invention herein set forth.

While my invention resulted from the application of ignitron contractors on large induction motors, my invention is not to be limited to this particular kind of use. For example any inductive load involving parallel circuits requiring the parallel operation of ignitrons may be used as a balancing reactor and such use falls within the spirit and scope of my invention.

I claim as my invention:

1. In a system of control for controlling the operation of an inductive load, in combination, an inductive load unit having a pair of load circuits, a pair of alternating current terminals for supplying electric energy to the load unit, a first electric discharge valve, connected in series with one load circuit, connected across the said pair of terminals, a second electric discharge valve, connected in series with said one load circuit, connected across the said pair of terminals but the said first and second electric discharge valves being connected in anti-parallel with respect to each other, a third electric discharge valve, connected in series with the second load circuit, connected across the said pair of terminals, a fourth electric discharge valve, connected in series with said second load circuit, connected across the said pair of terminals but the said third and fourth electric discharge valves being connected in anti-parallel with respect to each other, whereby the first and third electric discharge valves are connected in parallel and the second and fourth electric discharge valves are connected in parallel and the two inductive load circuits being connected in parallel effect the parallel operation of the electric discharge valves.

2. In a system of control for a load unit, in combination, a load unit having a pair of load circuits, said load circuits having some reactance, a pair of ignitrons in anti-parallel connected in series with each load circuit to thus provide two series circuits, a pair of terminals energized with alternating current, and circuit means for connecting said two series circuits in parallel to said terminals.

3. In a system of control for a load unit, in combination, a load unit having a pair of load circuits, said load circuits having some reactance, a pair of ignitrons in anti-parallel connected in series with each load circuit to thus provide two series circuits, a pair of terminals energized with alternating current, circuit means for connecting said two series circuits in parallel to said terminals, and firing control circuits for the ignitrons to change the firing angle with respect to the voltage cycle at the terminals to thus vary the load current.

4. In a system of control for induction motors, in combination, a three-phase induction motor having two Y-connected primary windings to thus provide two free terminals for each phase winding, three supply leads for supplying three-phase alternating current to the primary windings, twelve ignitrons, one pair of anti-parallel connected ignitrons being connected to each free terminal, and circuit means for connecting one supply lead to the first group of four ignitrons supplying the first phase of the primary winding, for connecting the second supply lead to the second group of four ignitrons supplying the second phase of the primary winding, and for connecting the third supply lead to the third group of four ignitrons supplying the third phase of the primary winding.

5. In a system of control, in combination, an electric load unit having two reactive windings for effecting the operation of a load, a pair of control ignitrons, connected in anti-parallel, connected in each load circuit, thereby providing two controlled load circuits, a pair of conductors energized with alternating current, and circuit means for connecting the controlled circuits in parallel across said conductors.

6. In a system of control, in combination, an electric load unit having two reactive windings for effecting the operation of a load, a pair of control ignitrons, connected in anti-parallel, connected in each load circuit, thereby providing two controlled load circuits, a pair of conductors energized with alternating current, circuit means for connecting the controlled circuits in parallel across said conductors, and firing control circuits for the ignitrons for controlling the load current drawn by said load unit.

7. In a system of control for an induction motor, in combination, a three-phase induction motor having a pair of primary windings each pair being connected in Y and thus having six free terminals one pair for each phase, three supply leads, and a pair of ignitrons, connected in anti-parallel, connected between each free terminal and each of the respective leads.

8. In a system of control for an induction motor, in combination, a three-phase induction motor having a pair of primary windings thus having six free terminals one pair for each phase, three supply leads, a pair of ignitrons, connected in anti-parallel, connected between each pair of free terminals and each lead, and control circuits for controlling the firing sequence of said ignitrons.

9. In a system of control, in combination, a load unit consisting of six reactive windings for effecting the operation of a load, a pair of ignitrons, connected in anti-parallel, connected in series with each reactive winding to thus form six series circuits, three supply leads energized with alternating current, circuit means for connecting one pair of series circuits in parallel across a first and second of said supply leads, circuit means for connecting a second pair of said series circuits in parallel across the second and third of said supply leads, and circuit means for connecting a third pair of said series circuits in parallel across a third and first of said supply leads.

10. In a system of control, in combination, a load unit consisting of six reactive windings for effecting the operation of a load, a pair of ignitrons, connected in anti-parallel, connected in series with each reactive winding to thus form six series circuits, three supply leads energized with alternating current, circuit means for connecting one pair of series circuits in parallel across a first and second of said supply leads, circuit means for connecting a second pair of said series circuits in parallel across the second and third of said supply leads, circuit means for connecting a third pair of said series circuits in parallel across a third and first of said supply leads, and firing control circuits for controlling the firing sequence of the ignitrons.

11. In a system of control for an induction motor, in combination, a three-phase induction motor having two primary windings and thus having six free terminals one pair for each phase, three supply leads comprising a three-phase supply, a pair of ignitrons, connected in antiparallel, connected between one supply lead and each one of the free terminals of one phase, a second pair of ignitrons, connected in antiparallel, connected between the second supply lead and each one of the free terminals of the second phase, and a third pair of ignitrons connected in antiparallel, connected between the third supply lead and each one of the free terminals of the third phase.

12. In an electric system of control, in combination, an electric load unit having two reactive load circuits disposed with respect to each other to be inductively coupled, a pair of ignitrons connected in series with one of said reactive load circuits, said ignitrons being connected in antiparallel, a second pair of ignitrons connected in series with the other of said reactive load circuit, said second pair of ignitrons also being connected in antiparallel, a pair of conductors energized with alternating current, and circuit means for connecting the two series circuits, each including one of said reactive load circuits and one pair of antiparallel connected ignitrons, in parallel across said conductors.

13. In an electric system of control, in combination, a pair of supply leads energized with alternating current, an electric load unit including two reactive windings for effecting the operation of a load, a pair of ignitrons connected in antiparallel with respect to each other, a second pair of ignitrons connected in antiparallel with respect to each other, first circuit means connecting said first pair of ignitrons in series with one of said reactive windings to form a first series circuit, second circuit means connecting said second pair of ignitrons in series with the other of said reactive windings to form a second series circuit, and third circuit means for connecting said two series circuits in parallel across said supply leads.

14. In an electric system of control, in combination, a pair of supply leads energized with alternating current, an electric load unit including two reactive windings for effecting the operation of a load, a pair of ignitrons connected in antiparallel with respect to each other, a second pair of ignitrons connected in antiparallel with respect to each other, first circuit means connecting said first pair of ignitrons in series with one of said reactive windings to form a first series circuit, second circuit means connecting said second pair of ignitrons in series with the other of said reactive windings to form a second series circuit, third circuit means for connecting said two series circuit in parallel across said supply leads, and firing control circuits for the ignitrons to change the firing angle with respect to the voltage cycle at the supply leads to thus vary the load current flowing in said electric load unit.

References Cited in the file of this patent

UNITED STATES PATENTS

| Number | Name | Date |
|---|---|---|
| 1,376,453 | Meyer | May 3, 1921 |
| 2,005,875 | Silverman | June 25, 1935 |
| 2,140,736 | Demontvignier | Dec. 20, 1938 |
| 2,185,820 | Schmidt | Jan. 2, 1940 |
| 2,535,499 | Lexa | Dec. 26, 1950 |
| 2,600,585 | Solomon | June 17, 1952 |

OTHER REFERENCES

"Electronic Engineering Principles," Ryder, Prentice-Hall Inc., 1947.